United States Patent [19]

Doering

[11] Patent Number: 5,042,243
[45] Date of Patent: Aug. 27, 1991

[54] TINE MOUNTING ARRANGEMENT AND METHOD

[75] Inventor: Charles W. Doering, Louisville, Ky.

[73] Assignee: Brinly-Hardy Co., Inc., Louisville, Ky.

[21] Appl. No.: 393,242

[22] Filed: Aug. 14, 1989

[51] Int. Cl.⁵ .................. A01D 7/06; A01D 78/08
[52] U.S. Cl. .................. 56/400; 56/DIG. 9; 460/122
[58] Field of Search .............. 56/400–400.16, 56/400.21, 365, 370, 375, DIG. 9, DIG. 21; 460/122, 128; 411/970; 29/428, 509, 512, 513

[56] References Cited

U.S. PATENT DOCUMENTS

| | | | |
|---|---|---|---|
| Re. 32,551 | 12/1987 | Doering | 56/396 |
| 2,581,481 | 1/1952 | Hartman et al. | |
| 2,764,163 | 9/1956 | Thys | |
| 2,953,830 | 9/1960 | MacRae | 56/400 |
| 3,099,347 | 7/1963 | Dahlquist | 56/400 |
| 3,318,086 | 5/1967 | Whitaker et al. | 29/513 |
| 3,859,777 | 1/1975 | Doering | 56/400 |
| 3,904,026 | 9/1975 | Hofer | 56/400 |
| 4,805,592 | 2/1989 | Enami | 29/509 |

*Primary Examiner*—Terry L. Melius
*Attorney, Agent, or Firm*—Frank C. Leach, Jr.

[57] ABSTRACT

A tine mounting tray includes a substantially planar portion from which a plurality of smaller substantially planar portions are punched out. Each of the punched out portions is spaced from the remainder of the substantially planar portion of the mounting tray to form an opening to receive a substantially V-shaped connecting portion between two tines of a tine assembly to be mounted on the mounting tray. Each of the punched out portions has a tab at one end, which is bent upwardly after the connecting portion of the tine assembly has been inserted within the opening so that the connecting portion of the tine assembly abuts the two connecting sides of the punched out portion. This bending of the tab connects the tine assembly to the mounting tray through preventing withdrawal of the tine assembly from the mounting tray.

19 Claims, 2 Drawing Sheets

TINE MOUNTING ARRANGEMENT AND METHOD

This invention relates to a mounting arrangement for a tine assembly and, more particularly, to a tine mounting arrangement requiring no extra parts for connecting the tine assembly to a mounting tray.

Each of U.S. Pat. Nos. 2,764,163 to Thys, 2,953,830 to MacRae, 3,859,777 to me, and 3,904,026 to Hofer suggests an arrangement for mounting tines or similar articles on a support without a bolt and nut. My aforesaid patent is directed to a rotary tine structure, and the aforesaid MacRae patent utilizes additional parts to retain a tine assembly. More complex arrangements for similar articles are found in the aforesaid Thys and Hofer patents.

In my U.S. Pat. No. Re. 32,551, there is shown a pushed dethatching unit having two rows of tines mounted on a substantially flat, horizontally disposed plate or tray. The plate or tray has holes punched therein with each hole receiving a bolt for mounting a tine assembly on the plate or tray. A substantially V-shaped connecting portion of a tine assembly having two tines with coils between the tines and the connecting portion is held against the bottom of the plate or tray and in contact with each bolt by a washer and a nut. The connecting portion of each of the tine assemblies also bears against two depressed portions of the plate or tray, which are aligned with the center of the opening for the bolt. This arrangement is used to mount each of the tine assemblies on the plate or tray.

While this mounting arrangement is satisfactory and two washers including a lock washer are used in a present commericially sold pushed dethatching unit rather than only a single washer as shown and described in my aforesaid patent, U.S. Pat. No. Re. 32,551, the mounting arrangement of my aforesaid patent, U.S. Pat. No. Re. 32,551, requires the extra parts of the bolts, washers, and nuts to be supplied to the purchaser, who assembles the tine assemblies on the mounting plate or tray. These extra parts not only increase the cost of the pushed dethatching unit but also have the possibility of being lost or misplaced.

The present invention provides an improved mounting arrangement in which there is no requirement for any extra part or parts for mounting each of the tine assemblies on the mounting plate or tray. Thus, this reduces the cost of manufacture and the assembly time for a customer.

The present invention punches out a plurality of substantially planar portions from a substantially planar portion constituting a plate or tray on which the tine assemblies are to be mounted. By including a tab on one end of each of the substantially planar portions, which are punched out, an arrangement is provided for not only mounting each of the tine assemblies but also for connecting each of the tine assemblies to the mounting plate or tray. Therefore, by using a progressive die in which the punching out of the substantially planar portions occurs in a first portion of the progressive die, a mounting arrangement is formed in which no extra parts are required to mount each of the tine assemblies.

An object of this invention is to provide a unique tine mounting arrangement.

Another object of this invention is to provide a tine mounting arrangement requiring no extra part or parts for mounting a tine assembly on a mounting plate or tray.

A further object of this invention is to reduce the time for a customer to assemble a tine mounting arrangement.

Other objects of this invention will be readily perceived from the following description, claims, and drawings.

This invention relates to a tine mounting arrangement including a tine assembly, which includes a pair of tines and a connecting portion extending between the tines and connected to each of the tines. Support means, which supports the tine assembly, has receiving means for receiving the connecting portion of the tine assembly with the receiving means and the support means being a single piece. The support means has securing means for securing the connecting portion of the tine assembly to the support means to prevent disconnection of the tine assembly from the support means with the securing means and the receiving means being a single piece. The securing means provides the sole securing of the connecting portion of the tine assembly to the support means.

This invention also relates to a method for mounting a tine assembly having a connecting portion connecting a pair of tines including forming a first substantially planar portion of tine support means as a single piece with a second substantially planar portion of the tine support means by connecting sides extending therebetween and the first substantially planar portion being spaced from the second substantially planar portion to form an opening therebetween to receive the connecting portion of the tine assembly having the pair of tines connected to each other by the connecting portion. A tab is formed as a single piece with the first substantially planar portion and in substantially the same plane. The connecting portion of the tine assembly is disposed within the opening between the first and second substantially planar portions and the connecting sides. The tab is bent out of substantially the same plane as the first substantially planar portion and towards the second substantially planar portion to a connecting position to connect the tine assembly to the support means after the connecting portion of the tine assembly is disposed within the opening.

The attached drawings illustrate preferred embodiments of the invention, in which.

Figures 1, 4:
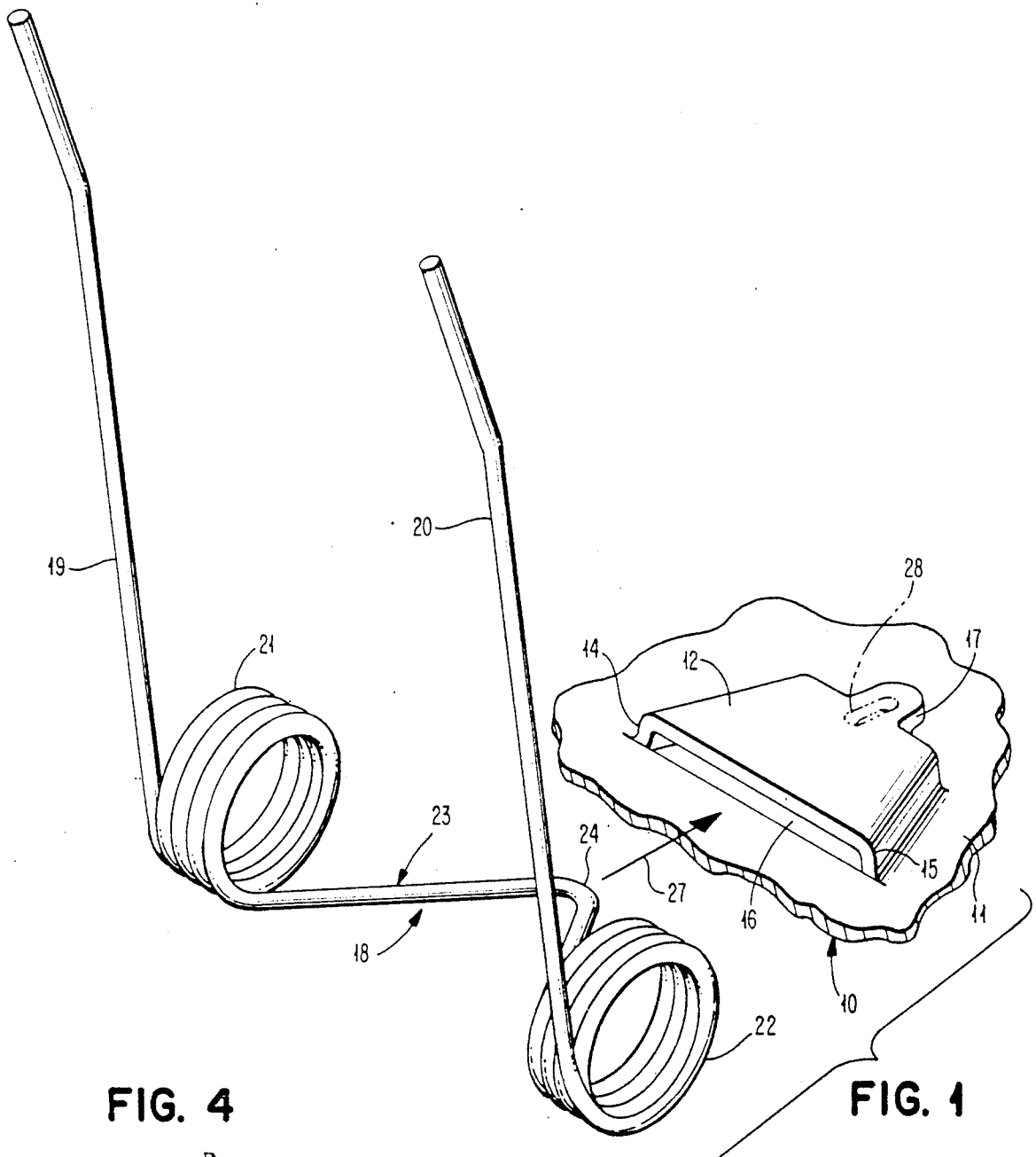
FIG. 1 is a perspective view of a portion of a bottom of a mounting tray of the present invention and a tine assembly to be mounted thereon.
FIG. 4 is a side elevational view of a mounting tray having two rows of the tine assemblies mounted thereon.

Referring to the drawings and particularly FIG. 1, there is shown a mounting plate or tray 10, which includes a substantially planar portion 11 in a manner similar to that in my aforesaid patent, U.S. Pat. No. Re. 32,551, which is incorporated by reference herein. The substantially planar portion 11 has a plurality of substantially planar portions 12 (one shown) punched therefrom with each of the substantially planar portions 12 being connected to the substantially planar portion 11 by connecting sides 14 and 15 extending between the substantially planar portion 11 and each of the substantially planar portions 12. Accordingly, a lanced opening 16 is formed between the substantially planar portion 11 and each of the substantially planar portions 12 with the opening 16 having its sides defined by the connecting sides 14 and 15.

Each of the substantially planar portions 12 has a tab 17 extending from its end opposite to the end having the opening 16. The tab 17 is a single piece with the substantially planar portion 12 since it is punched out of the substantially planar portion 11 of the mounting tray 10 at the same time. Thus, the tab 17 is in the same plane as the substantially planar portion 12 with which the tab 17 is integral.

As shown in FIG. 4, the mounting tray 10 has two rows of tine assemblies 18 with each row having a plurality of the tine assemblies 18. The number of rows of the tine assemblies 18 may be one or more than two. The tine assemblies 18 are preferably offset as shown and described in my aforesaid patent, U.S. Pat. No. Re. 32,551.

Each of the tine assemblies 18 (see FIG. 1) includes a pair of tines 19 and 20. The tine 19 includes a coiled portion 21 extending from its upper portion, and the tine 20 has a coiled portion 22 extending from its upper portion. A substantially V-shaped connecting portion 23 connects the coiled portion 21 of the tine 19 and the coiled portion 22 of the tine 20. It should be understood that the connecting portion 23 may have a shape other than V-shaped if desired.

Figure 2:
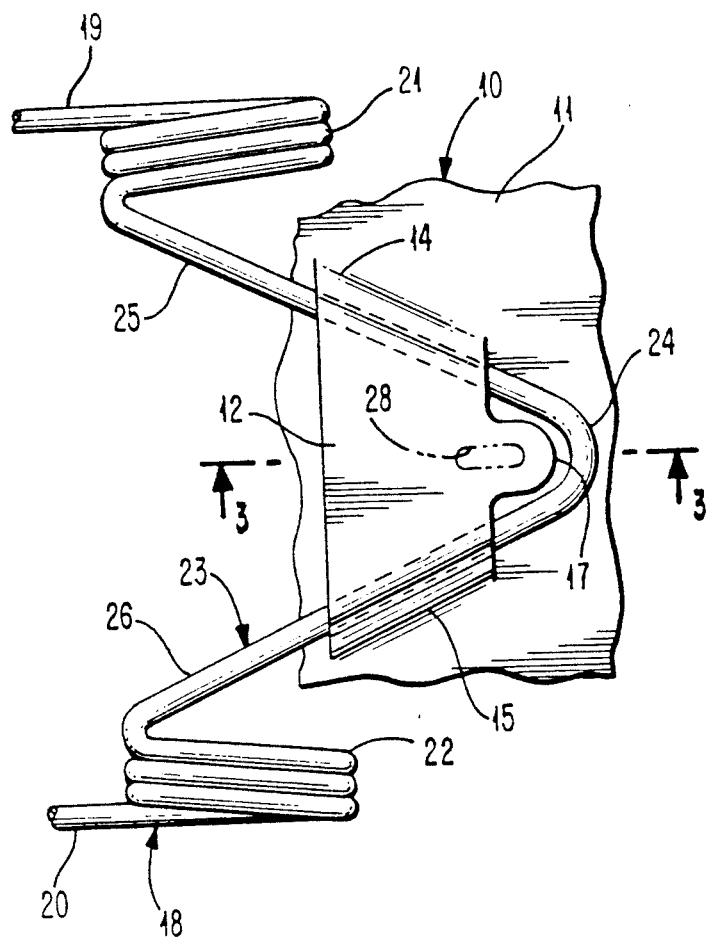
FIG. 2 is a fragmentary bottom plan view of a portion of the mounting tray of FIG. 1 with the tine assembly disposed for support thereby and showing a modification in phantom.

As shown in FIG. 2, the connecting portion 23 has a curved end 24. Each of the substantially horizontal planar portions 12 has its dimensions selected so that sides 25 and 26 of the connecting portion 23 will bear against the connecting sides 14 and 15, respectively, when the tine assembly 18 is inserted to the position at which it is to be retained on the mounting tray 10.

Therefore, when the connecting portion 23 of the tine assembly 18 is inserted into the opening 16 (see FIG. 1) in the direction indicated by an arrow 27, the connecting portion 23 enters the opening 16 and is guided by the sides 25 (see FIG. 2) and 26 of the connecting portion 23 engaging the connecting sides 14 and 15, respectively, of the substantially planar portion 12. The maximum insertion of the tine assembly 18 into the opening 16 (see FIG. 1) is shown in FIG. 2 in which the curved end 24 of the connecting portion 23 is positioned beyond the tab 17.

Figure 3:
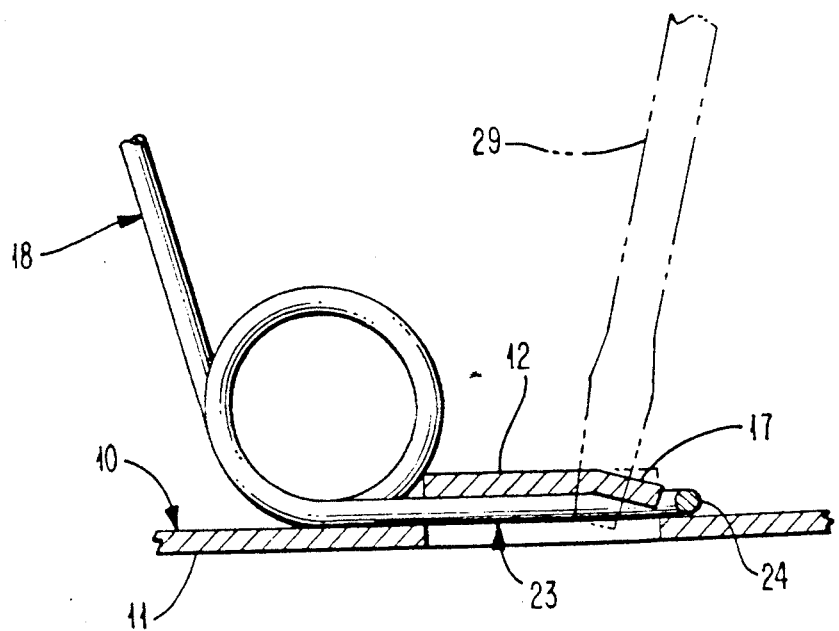
FIG. 3 is a fragmentary sectional view, partly in elevation, of the mounting tray of FIG. 2 with the tine assembly mounted thereon with a tab in its tine retaining or connecting position and taken along line 3—3 of FIG. 2.

When the curved end 24 of the connecting portion 23 of the tine assembly 18 is beyond the tab 17 as shown in FIG. 2, the tab 17 is then bent towards the substantially planar portion 11 of the mounting tray 10 as shown in FIG. 3. Accordingly, the tab 17 is pushed towards the plane of the substantially planar portion 11 so as to be in a position to engage the curved end 24 of the connecting portion 23 of the tine assembly 18 if retraction of the tine assembly 18 is attempted. Thus, the tab 17 connects or attaches the tine assembly 18 to the mounting tray 10.

If it becomes necessary to replace one of the tine assemblies 18 because one of the tines 19 (see FIG. 1) and 20 breaks, the tab 17 is returned from the position of FIG. 3 to a position in which it is in substantially the same plane as the substantially planar portion 12 with which the tab 17 is integral. This enables the connecting portion 23 (see FIG. 2) of the tine assembly 18 to be withdrawn from between the substantially planar portion 11 and the substantially planar portion 12. Then, another of the tine assemblies 18 can be disposed within the opening 16 (see FIG. 1) in the same manner as previously described and retained in the same manner by bending the tab 17 out of the plane of the substantially planar portion 12 and towards the substantially planar portion 11 as shown in FIG. 3.

If desired, the substantially planar portion 12 (see FIG. 2) and the tab 17 can have a hole or passage 28 (shown in phantom in FIG. 2) extending therethrough. The hole or passage 28 receives a tool 29 (shown in phantom in FIG. 3) such as a screw driver, for example, to enable bending of the tab 17 rather than manually bending the tab 17.

While the mounting tray 10 has been shown as being horizontally disposed, it should be understood that the mounting tray 10 may be disposed at any angle between horizontal and vertical, if desired. It is only necessary that the mounting tray 10 have the substantially planar portion 11 and the substantially planar portions 12.

An advantage of this invention is that it reduces the cost of manufacture. Another advantage of this invention is that it eliminates the need for any extra parts for mounting a tine assembly on a mounting tray. A further advantage of this invention is that it enables easier assembly of tine assemblies on a mounting tray by a purchaser since it is only necessary to bend a tab to secure each of the tine assemblies to the mounting tray. Still another advantage of this invention is that the time for a purchaser to assemble is greatly reduced.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. A tine mounting arrangement including:
   a tine assembly including:
      a pair of tines;
      and a connecting portion extending between said tines and connected to each of said tines;
   support means for supporting said tine assembly;
   said support means having receiving means for receiving said connecting portion of said tine assembly, said receiving means and said support means being a single piece;
   said support means having securing means for securing said connecting portion of said tine assembly to said support means to prevent disconnection of said tine assembly from said support means, said securing means and said receiving means being a single piece;
   said support means including a substantially planar portion; and said receiving means including:
      a substantially planar portion spaced from said substantially planar portion of said support means to form an opening therebetween for receiving said connecting portion of said tine assembly;
      first side means extending between one side of said substantially planar portion of said receiving means and said substantially planar portion of said support means;

second side means extending between the other side of said substantially planar portion of said receiving means and said substantially planar portion of said support means;

and said first and second side means of said receiving means cooperating with said connecting portion of said tine assembly to limit advancement of said connecting portion of said tine assembly into said receiving means.

2. The tine mounting arrangement according to claim 1, in which said securing means and said substantially planar portion of said receiving means are a single piece.

3. The tine mounting arrangement according to claim 2 in which said securing means is a tab extending from an end of said substantially planar portion of said receiving means, said tab being disposed in a receiving position in the same plane as said substantially planar portion of said receiving means prior to said connecting portion of said tine assembly being received within said opening formed between said substantially planar portion of said receiving means and said substantially planar portion of said support means, said tab remaining in the receiving position in the same plane as said substantially planar portion of said receiving means when said connecting portion of said tine assembly is received within said opening formed between said substantially planar portion of said receiving means and said substantially planar portion of said support means and being movable to a preventing position out of the plane of said substantially planar portion of said receiving means toward said substantially planar portion of said support means after said connecting portion of said tine assembly is disposed within said opening and engaging said first and second side means to prevent withdrawal of said connecting portion of said tine assembly.

4. The tine mounting arrangement according to claim 3 including tool receiving means in at least said tab for receiving a tool to enable bending of said tab between its receiving and preventing positions.

5. The tine mounting arrangement according to claim 4 in which said substantially planar portion of said receiving means and said first and second side means of said receiving means are punched out of said substantially planar portion of said support means.

6. The tine mounting arrangement according to claim 3 in which said substantially planar portion of said receiving means and said first and second side means of said receiving means are punched out of said substantially planar portion of said support means.

7. The tine mounting arrangement according to claim 1 in which said substantially planar portion of said receiving means and said first and second side means of said receiving means are punched out of said substantially planar portion of said support means.

8. The tine mounting arrangement according to claim 1 in which said substantially planar portion of said support means and said substantially planar portion of said receiving means are spaced from each other no more than a slightly greater distance than the size of said connecting portion of said tine assembly to have a substantially tight fit therewith to prevent movement of said connecting portion of said tine assembly relative to said support means during use.

9. A tine mounting arrangement including:
a tine assembly including:
a pair of tines;
and a connecting portion extending between said tines and connected to each of said tines;
support means having receiving means for receiving said connecting portion of said tine assembly, said receiving means and said support means being a single piece;
said support means having securing means for securing said connecting portion of said tine assembly to said support means, said securing means and said receiving means being a single piece;
said support means including a substantially planar portion;
said receiving means including:
a substantially planar portion spaced from said substantially planar portion of said support means to form an opening therebetween for receiving said connecting portion of said tine assembly;
first side means extending between one side of said substantially planar portion of said receiving means and said substantially planar portion of said support means;
second side means extending between the other side of said substantially planar portion of said receiving means and said substantially planar portion of said support means;
and said first and second side means of said receiving means cooperating with said connecting portion of said tine assembly to limit advancement of said connecting portion of said tine assembly into said receiving means;
said securing means and said substantially planar portion of said receiving means being a single piece;
and said securing means is a tab extending from an end of said substantially planar portion of said receiving means, said tab being disposed in a receiving position in the same plane as said substantially planar portion of said receiving means when said connecting portion of said tine assembly is received within said opening formed between said substantially planar portion of said receiving means and said substantially planar portion of said support means and being movable to a preventing position out of the plane of said substantially planar portion of said receiving means toward said substantially planar portion of said support means after said connecting portion of said tine assembly is disposed within said opening and engaging said first and second side means to prevent withdrawal of said connecting portion of said tine assembly.

10. The tine mounting arrangement according to claim 9 including tool receiving means in at least said tab for receiving a tool to enable bending of said tab between its receiving and preventing positions.

11. The tine mounting arrangement according to claim 10 in which said tool receiving means is a hole extending through a portion of said tab and a portion of said substantially planar portion of said receiving means from which said tab extends.

12. The tine mounting arrangement according to claim 11 in which said substantially planar portion of said receiving means and said first and second side means of said receiving means are punched out of said substantially planar portion of said support means.

13. A method of mounting a tine assembly having a connecting portion connecting a pair of tines including:
forming a first substantially planar portion of tine support means as a single piece with a second substantially planar portion of the tine support means by connecting sides and the first substantially planar portion being spaced from the second substantially planar portion to form an opening therebetween to receive the connecting portion of the tine assembly having the pair of tines connected to each other by the connecting portion;

forming a tab as a single piece with the first substantially planar portion and in substantially the same plane;

disposing the connecting portion of the tine assembly within the opening between the first and second substantially planar portions and the connecting sides;

and bending the tab out-of substantially the same plane as the first substantially planar portion and towards the second substantially planar portion to a connecting position to connect the tine assembly to the tine support means after the connecting portion of the tine assembly is disposed within the opening.

14. The method according to claim 13 including forming the first substantially planar portion and the connecting sides of the tine support means as a single piece with the second substantially planar portion of the tine support means by punching out the first substantially planar portion of the tine support means from the second substantially planar portion of the tine support means.

15. The method according to claim 14 including:
forming a hole in the tab for receiving a tool;
and disposing a tool in the hole in the tab when the tab is to be bent to move it from its receiving position to its connecting position.

16. The method according to claim 13 including:
forming a hole in the tab for receiving a tool;
and disposing a tool in the hole in the tab when the tab is to be bent to move it from its receiving position to its connecting position.

17. A tine mounting arrangement including:
a tine assembly including:
a pair of tines;
and a connecting portion extending between said tines and connected to each of said tines;
support means for supporting said tine assembly;
said support means having receiving means for receiving said connecting portion of said tine assembly, said receiving means and said support means being a single piece;
and said support means having securing means for securing said connecting portion of said tine assembly to said support means to prevent disconnection of said tine assembly from said support means, said securing means and said receiving means being a single piece, and said securing means providing the sole securing of said connecting portion of said tine assembly to said support means.

18. A tine mounting arrangement including:
a tine assembly including:
a pair of tines:
and a connecting portion extending between said tines and connected to each of said tines;
support means for supporting said tine assembly;
said support means having receiving means for receiving said connecting portion of said tine assembly, said receiving means and said support means being a single piece;
said support means having securing means for securing said connecting portion of said tine assembly to said support means to prevent disconnection of said tine assembly from said support means, said securing means and said receiving means being a single piece;
and said securing means being movable between a position in which said securing means does not prevent said receiving means receiving said connecting portion of said tine assembly and a position in which said securing means prevents said connecting portion of said tine assembly from being removed from said receiving means after said connecting portion of said tine assembly is received by said receiving means to secure said connecting portion of said tine assembly to said support means.

19. The tine mounting arrangement according to claim 18 in which said securing means provides the sole securing of said connecting portion of said tine assembly to said support means.

* * * * *

UNITED STATES PATENT AND TRADEMARK OFFICE
CERTIFICATE OF CORRECTION

PATENT NO. : 5,042,243
DATED : August 27, 1991
INVENTOR(S) : Charles W. Doering

It is certified that error appears in the above-identified patent and that said Letters Patent is hereby corrected as shown below:

Column 1, line 6, "time" (both occurrences) should read

--- tine ---.

Column 4, lines 58 and 59, should read --- said support means including a substantially planar portion;

and said receiving means including: ---.

Column 5, line 11, cancel the "comma (,)".

Column 7, line 14, cancel the "hyphen (-)".

Signed and Sealed this

Twenty-second Day of December, 1992

Attest:

DOUGLAS B. COMER

*Attesting Officer*   *Acting Commissioner of Patents and Trademarks*